United States Patent
Rauchwerger (10) Patent No.: US 10,228,273 B1
(45) Date of Patent: Mar. 12, 2019

(54) SOLAR WIRELESS AUTOFILL OF LIQUID IN A CONTAINER

(71) Applicant: George Rauchwerger, Sunnyvale, CA (US)

(72) Inventor: George Rauchwerger, Sunnyvale, CA (US)

( * ) Notice: Subject to any disclaimer, the term of this patent is extended or adjusted under 35 U.S.C. 154(b) by 186 days.

(21) Appl. No.: 14/533,073

(22) Filed: Nov. 4, 2014

Related U.S. Application Data (60) Provisional application No. 61/960,587, filed on Sep. 23, 2013.

(51) Int. Cl.
*G01F 23/26* (2006.01)
*G01F 23/00* (2006.01)

(52) U.S. Cl.
CPC ........ *G01F 23/263* (2013.01); *G01F 23/0061* (2013.01); *G01F 23/0069* (2013.01)

(58) Field of Classification Search
CPC .......................... G01F 23/0061; G01F 23/0069
See application file for complete search history.

(56) References Cited

U.S. PATENT DOCUMENTS

| | | | | |
|---|---|---|---|---|
| 2010/0300548 | A1* | 12/2010 | DeVerse | E04H 4/12 137/1 |
| 2013/0181829 | A1* | 7/2013 | Schnitz | G06Q 10/08 340/539.1 |
| 2013/0247293 | A1 | 9/2013 | Jeronimus | |

FOREIGN PATENT DOCUMENTS

GB 2072851 A * 10/1981 ........... G01F 23/241

OTHER PUBLICATIONS

LevelSmart AutoFill System Brochure (2013) (2 pages).

* cited by examiner

*Primary Examiner* — Matthew G Marini
*Assistant Examiner* — Quang X Nguyen
(74) *Attorney, Agent, or Firm* — HIPLegal LLP; Judith Szepesi

(57) ABSTRACT

A solar wireless autofill system is presented. The solar wireless autofill system can include a liquid level sensor to sense a level of liquid in a container and a wireless transmitter to receive the level of liquid in the container from the liquid level sensor and to send a signal to a receiver when the level of liquid in the container is below a predefined level. The signal is not sent to the receiver when the liquid in the container is in motion. The receiver can receive the signal and cause additional liquid to be added to the container in response to the signal.

19 Claims, 5 Drawing Sheets

RECEIVER 300

NOTE: OUT stays ON as long as the pulses are present. When the pulses cease, the output turns OFF at the end of the 33 sec. delay. This also serves as a damping factor when waves are present.

FIG. 4

SOLAR WIRELESS AUTOFILL OF LIQUID IN A CONTAINER

RELATED APPLICATION

The present application claims priority to U.S. Provisional Application Ser. No. 61/960,587, which is incorporated herein in its entirety.

TECHNICAL FIELD

Embodiments of the present invention relate to maintaining a constant liquid level in a container, and more specifically to a solar wireless autofill of liquid in the container.

BACKGROUND OF THE INVENTION

To maintain a liquid level in a container, such as a vessel, swimming pool, tank, etc., a person can use a mechanical device, such as a float switches or an electrical device utilizing a resistance electrode or capacitance sensor. The device can be wired to a power supply that switches solenoid valves in order to fill the containers with liquid. The device can use batteries to power the sensing device.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

This invention pertains generally to systems for maintaining a constant water or liquid level in swimming pools, water tanks, ponds, animal drinking water troughs, sump pumps, ship hulls, beverage tanks and barrels, and other containers of various types, and similar applications.

In one embodiment, the present invention provides a no maintenance system for maintaining the liquid level constant in containers of various types. In one embodiment, a liquid level sensor senses the liquid using a capacitance sensor in a hermetically sealed plastic enclosure. In one embodiment, a transmitter wirelessly communicates with a remote receiver which can activate a solenoid valve for the purpose of autofilling the container.

In one embodiment, a solar cell recharges the enclosed battery of the transmitter during daylight hours, and turns off the circuit when it is dark in order to conserve battery power.

In one embodiment, a transmitter module is installed on the container with a fastener, such as strong double sided tape anywhere on the perimeter of the container (e.g., tile along the edge of the container, concrete along a side of the container, etc.). Other formats of fastener, such as screws, hook-and-loop, cement, glue or any other mechanism to securely fasten the transmitter may be utilized. The transmitter module includes the sensor and transmitter.

In one embodiment, the units (transmitter and receiver) are "paired", so they communicate only with each other, thus preventing the units from interfering with other similar systems, or other systems of the same kind. This also enables the use of multiple systems in proximity, without interference, for example for a barn with multiple water troughs, or a hotel with multiple pools.

In one embodiment, the units (transmitter and receiver) are identical transceivers.

In one embodiment, the units are programmed with timers (e.g., integrated circuit timers). The individually programmed timers in the transmitter and receiver unit are synchronized to prevent rapid cycling of the valve due to wave action of the liquid in the container. In one embodiment, the receiver unit actuates the valve when it receives a steady stream of indications from the transmitter unit. The steady stream of indications occurs when there is minimal movement of the liquid, or when the liquid is consistently low even with movement. In one embodiment, a sensor sends a signal to the transmitter timer, and in turn to a radio frequency (RF) signal that is sent to the receiver, indicating that it is time to turn the valve on. In one embodiment, the transmitter and receiver units are in contact with each other when the liquid in the container is below a predefined level (sensing point). The receiver energizes a valve that releases a flow of liquid into the container when the valve is on. In this embodiment, if either unit stops transmitting, the valve turns off, stopping the flow of liquid into the container, and therefore preventing an over fill of the container.

In one embodiment, a battery saver circuit causes the transmitter to turn off, or go to sleep, when the light upon the solar cell becomes insufficient, which would generally occur when it becomes dark. In this embodiment, the transmitter is off at night. In this embodiment, the transmitter is also off when the system is in storage, such as when the system is stored in a box awaiting shipment. The system therefore has negligible power use, when solar power is not available, and the battery can remain charged for a long period of time.

In one embodiment, the system is compact, efficient, low power, fail safe, with no moving parts, or wires. Moreover, the system of the present disclosure can be installed without having to dig for burying wires. Only a small amount of wiring needs to be made, and in most cases a homeowner may do it without the need to hire an electrician. Moreover, in this embodiment, since there is no actual electrical hook up in the container, there is no danger of electric shock. Moreover, the system of the present disclosure can be used for leak detection.

Figure 1A:
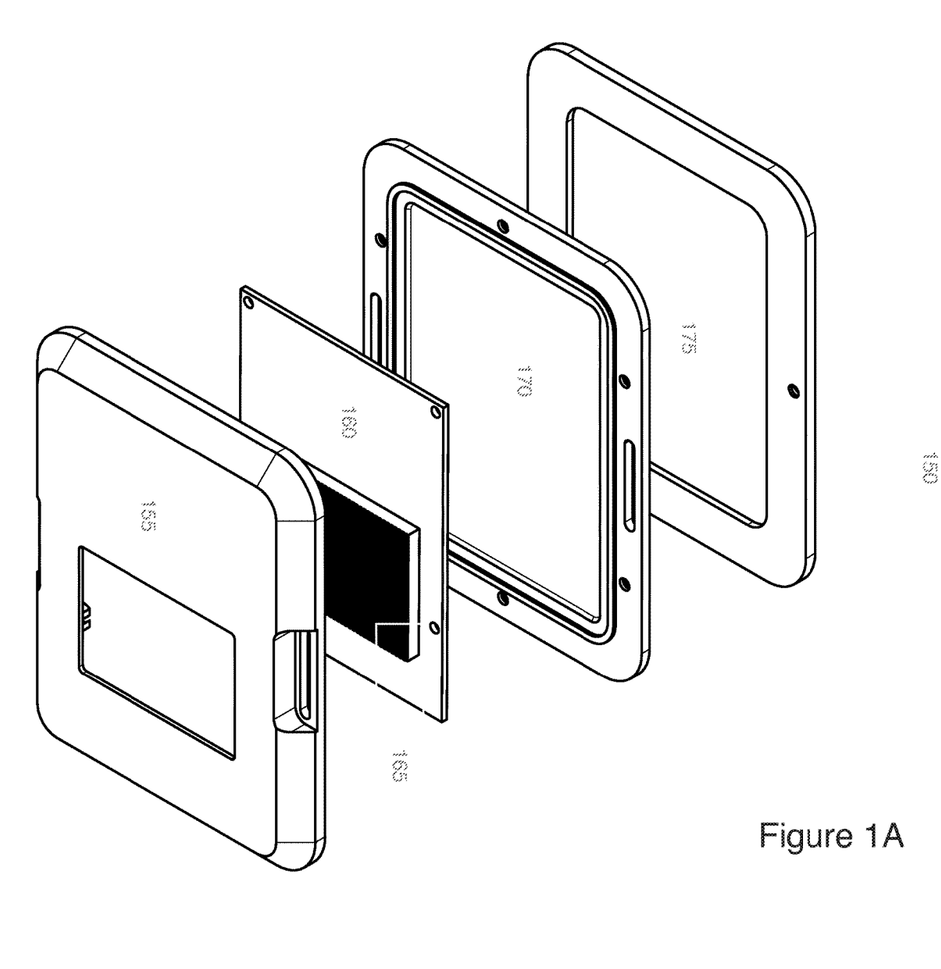
FIG. 1A is an exploded view of one embodiment of the transmitter portion of the Solar Wireless Autofill system.

FIG. 1A is an exploded view of one embodiment of the transmitter portion of the solar wireless autofill system 150. The transmitter portion of the solar wireless autofill system 150 has a slim design. For example, the solar wireless autofill system 150 can be about the size of a small smartphone. The transmitter portion of the solar wireless autofill system 150 can be mounted on almost any surface of a container. For example, the solar wireless autofill system 150 is mountable to any tile section of a swimming pool or other liquid container.

The transmitter portion of the solar wireless autofill system is installed in a waterproof enclosure. In one embodiment, the transmitter portion of the solar wireless autofill system 150 includes a first cover 155 with a cutout. A second panel 160 includes a solar cell 165 that protrudes through the first cover 155 and charges a battery (not shown) of the solar wireless autofill system 150. The second panel is also a covering that protects the unit. A third panel 170 includes a transmitter (not shown), a liquid level sensor (not shown), and a radio transmitter (not shown). The fourth panel 175 is a covering that protects the third panel and the unit as a whole. The fourth panel 175 can incorporate a backing plate (not shown), which is adhered to the surface of a container. The backing plate can be adhered to the surface by any fastener, such as double sided tape, screws, Velcro, magnets, etc. The solar wireless autofill system 150 can be mounted at a level equal to the level of the liquid in the container.

Figure 1B:
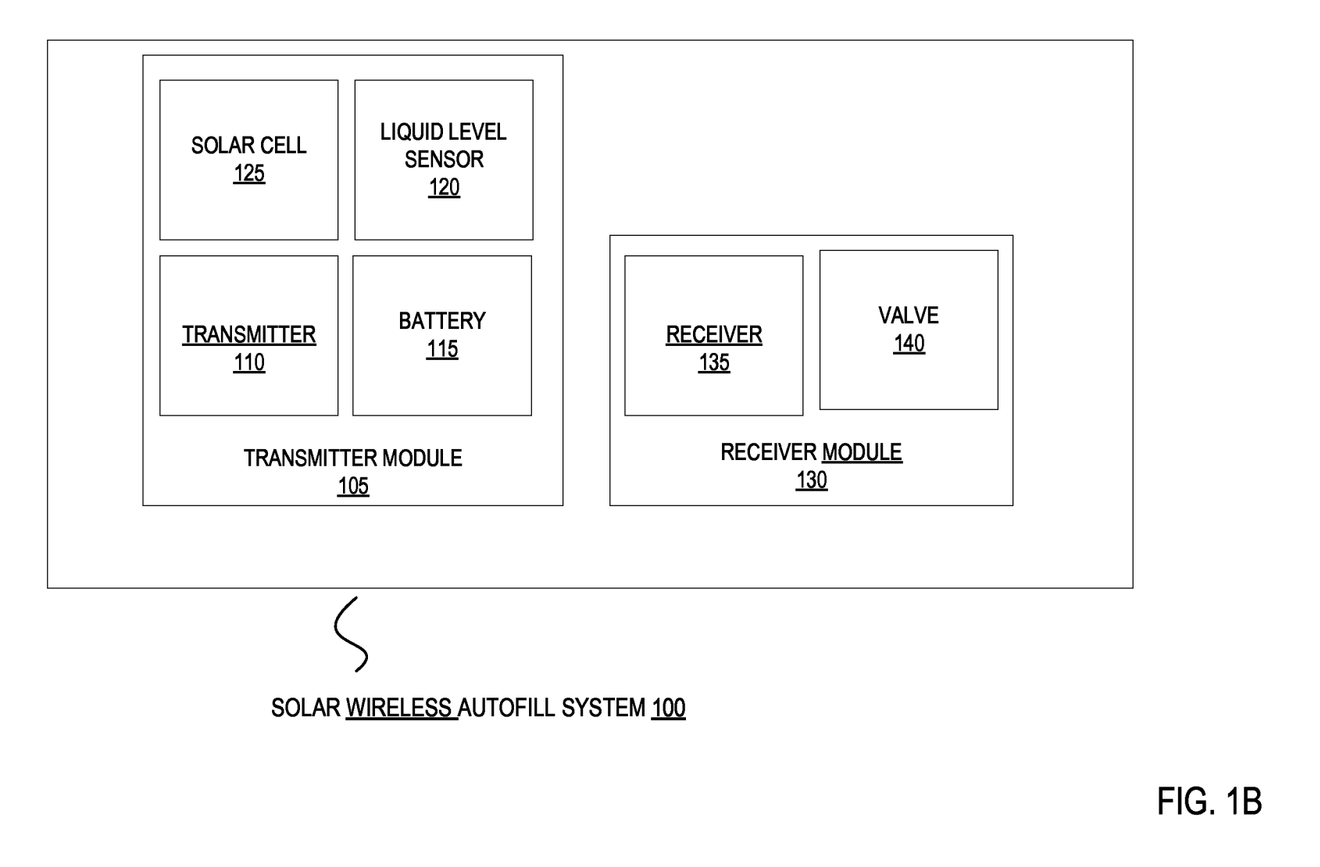
FIG. 1B is a block diagram of one embodiment of the Solar Wireless Autofill system.

FIG. 1B is a block diagram of one embodiment of the solar wireless autofill system. The solar wireless autofill system 100 includes a transmitter module 105 and a receiver module 130. The transmitter module 105 can be located in or near a container holding a liquid, such as a swimming pool, a trough, etc. The receiver module 130 can be mounted on or near a fill valve that controls the flow of a liquid. The receiver controls a mechanism which controls the flow of the liquid, such as a valve 140 that, when turned on, fills the container. For example, the receiver module 130 can control the valve 140 that adds water to a swimming pool.

The transmitter module 105 is a sealed electronic unit, and can include a transmitter 110, a battery 115, a liquid level sensor 120, and a solar cell 125. The receiver module 130 can include a receiver 135 and a valve 140. When the liquid level sensor 120 senses that the level of the liquid in the container has fallen below a preset or predefined point, the transmitter 110 transmits a signal to the receiver module 130. The receiver 135 in the receiver module 130 receives the signal, and the receiver 135 actuates the valve 140, thereby causing liquid to be supplied to the container. When the liquid level returns to the normal preset or predefined point, the transmitter 110 stops transmitting the signal, thereby causing the receiver 135 to closes the valve 140.

The valve 140 is any mechanism that can be actuated by the receiver 130, such as an electric solenoid valve. In one embodiment, the transmitter 110 and the receiver 135 are paired. In this embodiment, the signal sent by the transmitter 110 is coded, and can only be recognized by the matched receiver 135. In one embodiment, when the signal from transmitter 110 to receiver 135 is interrupted, the valve 140 automatically shuts off. In one embodiment, the transmitter 110 and the receiver 135 are identical transceivers. In an alternate embodiment, the transmitter 110 and the receiver 135 are different transceivers, or a transmitter and receiver as separate devices.

In one embodiment, the range between the transmitter module 110 and the receiver module 130 is large, such as 3000 feet or more. In one embodiment, the wireless communication between the transmitter 110 and the receiver 135 is a spread spectrum 916 MHZ remote control frequency. The receiver 135 and the valve 140 can be powered by a standard house current, or may include a converter to convert house power to a normal low voltage of 20 to 24 Volts using an AC/AC converter, or to a DC power, if appropriate.

The solar cell 125 charges the battery 115 using solar power. Therefore, the solar wireless autofill system 100 can only operate when there is enough light to charge the battery, or if house current is available. In one embodiment, a battery saver (not shown) causes the transmitter 110 to turn off, or sleep, when the light upon the solar cell 125 becomes insufficient. In this embodiment, the transmitter 110 is off at night and also when the solar wireless autofill system 100 is in storage, such as when stored in a box awaiting shipment. The battery 115 is therefore minimally drained when the transmitter 110 is off and the battery 115 can remain charged for a long period of time when there is insufficient light.

In one embodiment, the transmitter 110 and the receiver 135 are transceivers. In this embodiment, the transmitter 110 and the receiver 135 can be identical units (e.g., LINX TECHNOLOGY'S TRM-900-TT) and become a transmitter or receiver depending on the unit. In one embodiment when one of the units transmits a signal, the other unit receives the signal, and sends back a confirming signal (e.g., acknowledgment), to acknowledge a solid communication. Thus, the transmitter has the capability to act as a receiver, and vice versa. The frequency of transmission can be any frequency. In one embodiment, the frequency of the transmission is 916 MHZ. In one embodiment, a spread spectrum, frequency hopping signal is used. This provides a failsafe system, so if the signal is not acknowledged, or interrupted, no power goes to the valve 140, and the reservoir cannot be overfilled.

Figure 2:
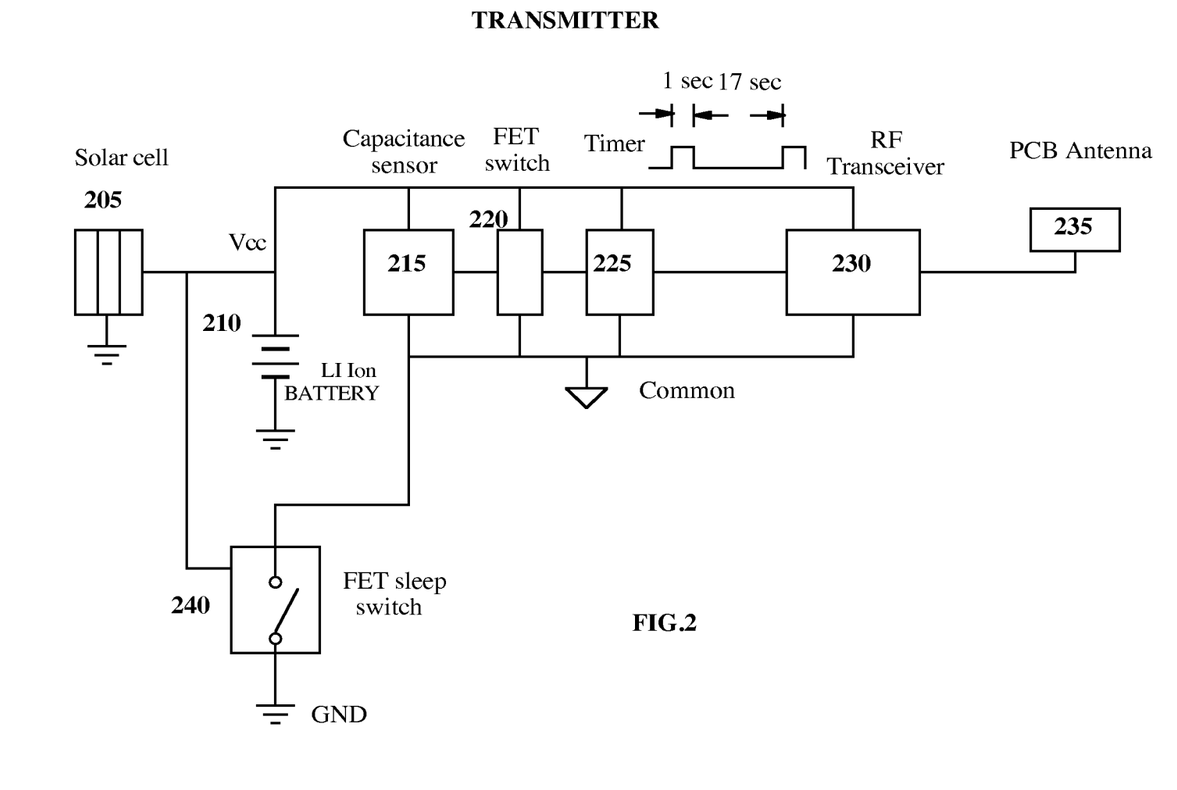
FIG. 2 is a circuit diagram of one embodiment of a transmitter module.

FIG. 2 is a circuit diagram of one embodiment of a transmitter module. The transmitter module 200, in one embodiment, includes a solar cell 205, a battery 210, a capacitance sensor 215, a FET switch 220, a timer 225, a RF transceiver 230, an antenna 235, and a sleep switch 240. Additional or fewer components can be included in the transmitter 200 without departing from the scope of the present disclosure. At a minimum, the transmitter module includes a sensor and a transmitter or transceiver.

The solar cell 205 charges the battery 210 during the day and controls the sleep switch 240. In one embodiment, the solar cell 205 charges the battery 210 during daylight hours, via a diode (e.g., a Shottky diode), at the same time the solar cell 205 provides a signal to the sleep switch 240. The sleep switch 240 is turned off when there is no light received by the solar cell 205 and switched on when there is light received by the solar cell 205. Because the battery 210 is charged by the solar cell 205, the battery 210 does not need to be replaced. Moreover, in one embodiment, the transmitter 200 is turned off via the sleep switch 240 during non-daylight hours or when the transmitter 200 is in storage, or otherwise is not receiving solar charging. Therefore, there is no battery drain when the transmitter 200 does not need to be in use. In one embodiment, this may also be accomplished by not having a battery.

The capacitance sensor 215 is an oscillator with a sensor contact connected to the input of a first op-amp. The sensor contact can be a metal strip, such as Beryllium copper or another metal. The first op-amp can be any op-amp, such as MAXIM INTEGRATED's Op-Amp Max-4257.

The capacitance sensor 215 is activated when there is contact with a liquid. In one embodiment, the sensor contact is a metal strip behind a thin plastic wall that is in contact with a liquid. In an alternate embodiment, the sensor contact is a metal (e.g., stainless steel) pinpoint in direct contact with the liquid. Alternate embodiments of a sensor contact can be used without departing from the scope of the present disclosure. For example, when the capacitance sensor 215 is in contact with air, the capacitance is low, the oscillator is OFF, and there is no signal from the capacitance sensor 215. When the capacitance sensor 215 is in contact with liquid, the capacitance increases, thus turning ON the oscillator, and creating a signal from the capacitance sensor 215. The capacitance sensor 215 is in contact with liquid when a liquid level in the container to which the transmitter 200 is attached is above a predefined level, such that the sensor contact is in contact with the liquid. The capacitance sensor 215 further includes a second OP-AMP in conjunction with a diode (e.g., Shottky diode) which rectifies the signal from the capacitance sensor 215, and turning the signal into a DC signal which turns ON or OFF the FET switch 220.

The FET Switch 220 controls the timer 225. When the FET switch is on, it produces a signal. The signal can be a train of pulses that are programmed in a manner to prevent a valve (in communication with a receiver, not shown) from cycling on and off when there is movement of the liquid in the container, such as when there are waves in the liquid. In one embodiment, the pulses are one second ON and 16 seconds OFF. Another length of pulses can be used without departing from the scope of the present disclosure. The ON pulse activates the RF transceiver 230, which is a wireless transceiver. When the RF transceiver 230 is activated, it sends a wireless signal to a receiver using the PCB antenna 235, causing the container to which the transmitter 200 is attached to be filled with additional liquid. When the liquid level in the container covers the sensor contact in the capacitance sensor 215, the capacitance sensor 215 turns off the FET switch 220, which turns off the signal from the FET switch 220 and deactivates the RF transceiver 230. When the signal is no longer transmitted by the antenna 235, the flow of additional liquid into the container to which the transmitter 200 is stopped. The antenna 235 can be a solid state miniature unit in order to minimize PCB size.

The components in the transmitter 200 return to a common ground. Moreover, the positive terminal of battery 210 is connected to the VCC, to provide the power to the components in the transmitter module 200.

Figure 3:
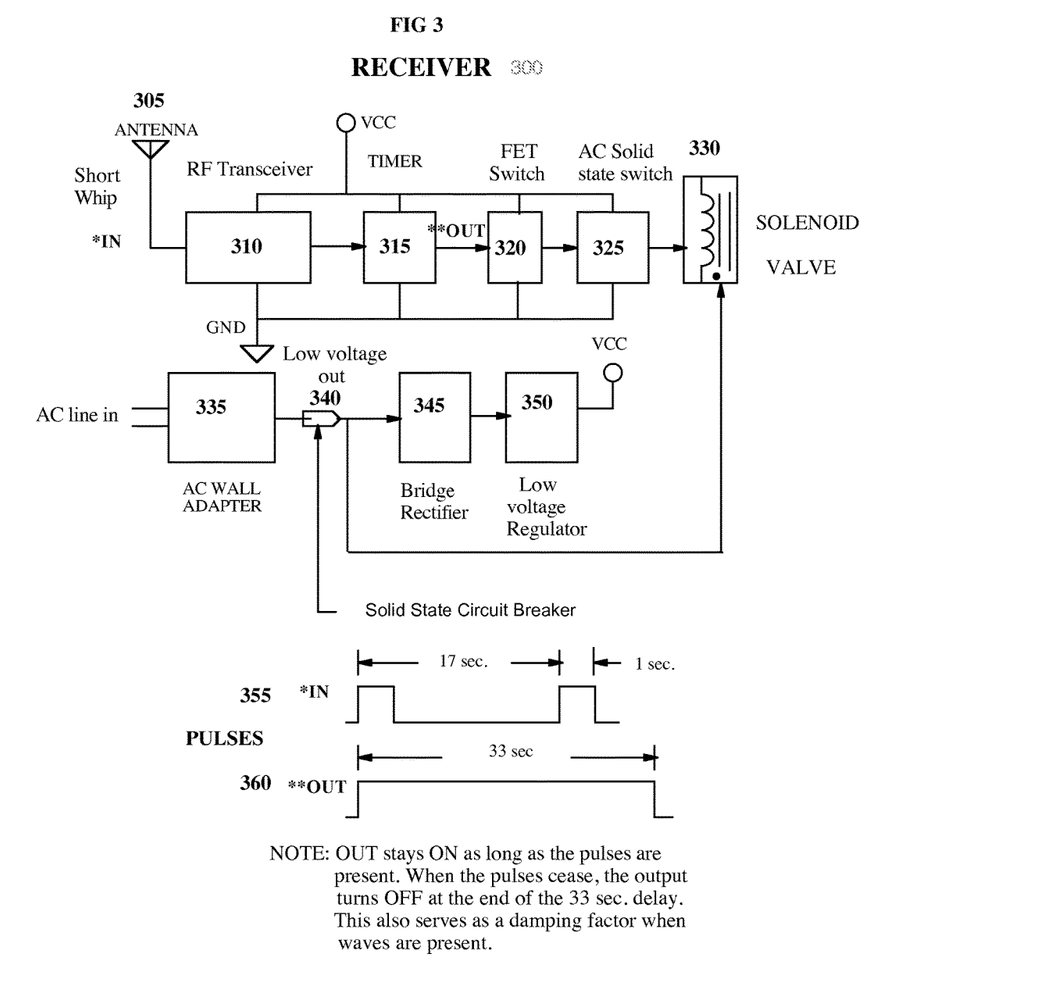
FIG. 3 is a circuit diagram of one embodiment of a receiver module.

FIG. 3 is a circuit diagram of one embodiment of a receiver module. The receiver, in one embodiment, includes an antenna 305, a transceiver 310, a timer 315, a FET switch 320, a solid state switch 325, a valve 330, an adapter 335, a circuit breaker 340, a bridge rectifier 345, and a low voltage regulator 350. Additional or fewer components can be included in the receiver 300 without departing from the scope of the present disclosure. At a minimum, the receiver includes a receiver or transceiver and a valve controller.

The receiver 300 can receive a signal from a transmitter, such as transmitter 200, via the antenna 305. The antenna 305 can be any size. In one embodiment, the antenna is 2.5 inches long, and ensures high reliability for long range communication. Alternate lengths of the antenna 305 can be used without departing from the scope of the present disclosure. When the signal is received by the antenna 305, the signal is transmitted to the transceiver 310, which passes the signal to the timer 315. The signal is in the form of pulses, with each pulse lasting a predefined period of time. For example, the pulse is 33 seconds long, such as pulse 360. As long as short pulses received by the timer 315 are present, the timer 315 generates an output that is a steady on signal. The input to timer 315 and the output generated by timer 315 are synchronized, and the signal length of the output signal depends on the signal length of the input signal.

The output from the timer 315 powers the FET switch 320, which powers the solid state switch 325. The solid state switch 325 energizes the valve 330, and causes the valve 330 to turn on, causing liquid to flow. In one embodiment, the valve 330 is a solenoid valve. For example, the valve 330 may be a 24V AC valve, such as an automatic sprinkler valve. As a precaution, if the signal from the sensor fluctuates due to wave action (movement of the liquid in the container to which the transmitter providing the signal is attached), the timer 315 does not start the output for a predefined amount of time. By delaying the start of the output, the timer 315 gives time for the wave action, or movement of the liquid, to cease, thereby preventing the valve 330 from cycling ON and OFF. Preventing cycling of the valve 330 can prevent premature wear, or failure if the valve 330.

When the pulses stop, the timer 315 continues to generate the on signal to the FET switch 320 for a predefined period of time. After the predefined period of time, the timer 315 generates an off signal thereby turning off the FET switch 320, the solid state switch 325, and the valve 330. In one embodiment, the predefined period of time is approximately 30 seconds. In an alternate embodiment, there is no predefined period of time, and the timer 315 stops generating the on signal as soon as soon as the signal is no longer received. Other periods of time can be used without departing from the scope of the present disclosure.

Power to the valve 330 is derived from the adapter 335. The adapter 335 can be any power adapter, such as a 24V AC power adapter. The adapter 335 provides a low voltage, which feeds the valve 330. This voltage is then rectified by a bridge 345, and regulated by the low voltage regulator 350, to a very low voltage energizing the DC circuits. The adapter 335 also provides power to other modules in the receiver 300 through the bridge rectifier 345 and the low voltage regulator 350. The bridge rectifier 345 can be a diode bridge.

Figure 4:
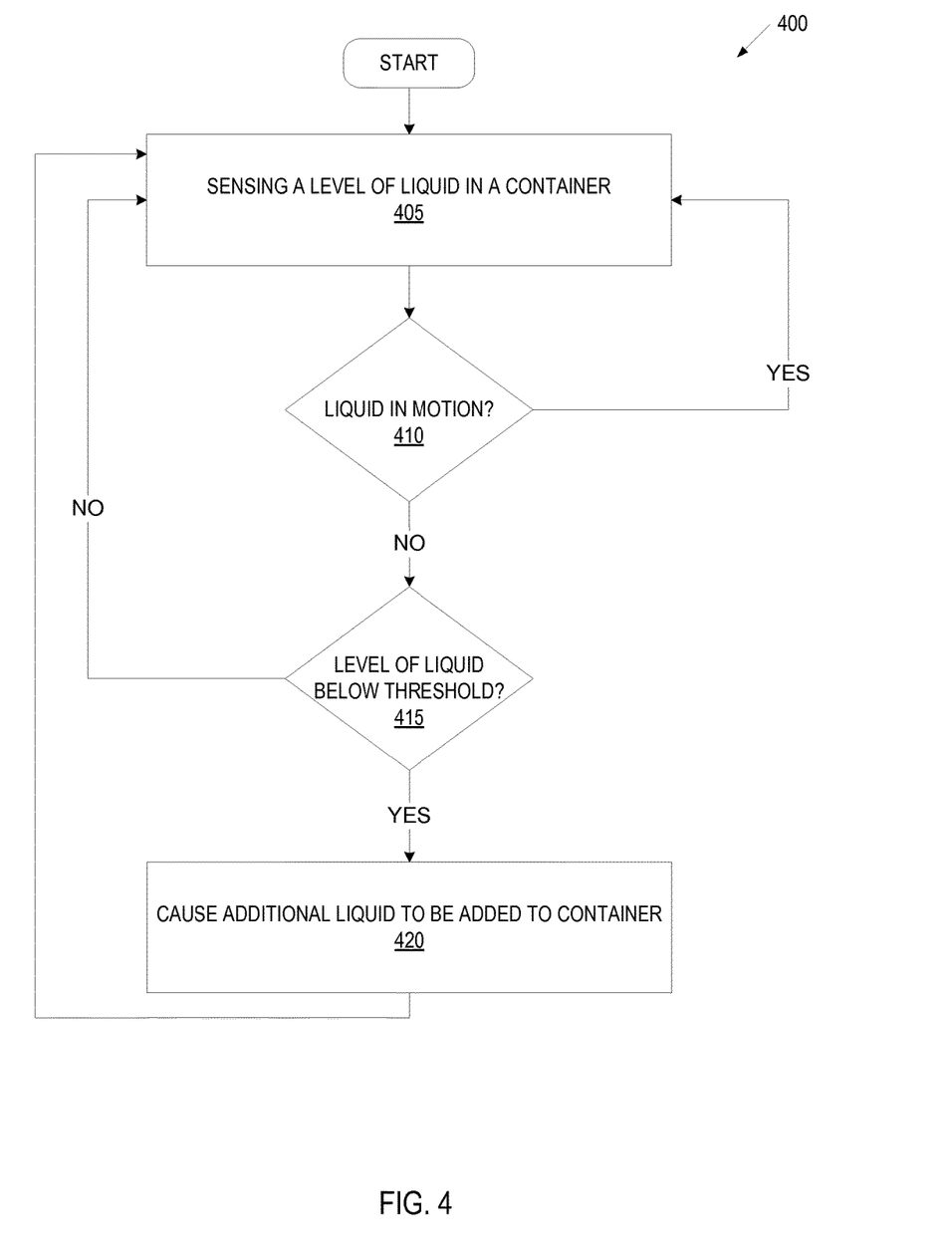
FIG. 4 is a flowchart of an embodiment of a method of autofilling the liquid in a container.

FIG. 4 illustrates an embodiment of a method of autofilling the liquid in a container. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the solar wireless autofill system 100 of FIG. 1B. In one embodiment, the method 400 will not be performed when there is not sufficient light, or when it sufficiently dark, in order to preserve battery. The method 400 will therefore not be performed during the night or when the solar wireless autofill system is in storage, such as when the system is in a box awaiting shipment.

At block 405, processing logic senses a level of liquid in a container. The level of liquid in the container can be sensed using a contact in the container.

At block 410, processing logic determines if the liquid in the container is in motion. The liquid in the container can be in motion when there is movement by people swimming or by wind if the container is a pool, by animals drinking if the container is a trough, etc. Processing logic can determine if the liquid in the container is in motion based on whether the contact in the container is in constant or intermittent contact with the liquid. If the liquid in the container is in motion, the method 400 returns to block 405 to sense the level of liquid in the container and wait for the liquid to stop being in motion. If the liquid in the container is not in motion, the method 400 proceeds to block 415.

At block 415, processing logic determines whether the level of liquid in the container is below a predefined threshold. The level of liquid in the container can be below a predefined threshold when there is insufficient liquid in the container. For example, a swimming pool may not have enough water due to evaporation or other reasons, an animal trough may not have enough water due to the animal drinking, etc. Processing logic can determine whether the level of liquid in the container is below a predefined threshold based on the level of liquid sensed in the container. If the level of liquid in the container is not below the predefined threshold, the method 400 returns to block 405 to continue sensing the level of liquid in the container. If the level of liquid in the container is below the predefined threshold, the method 400 proceeds to block 420.

At block 420, processing logic turns on a mechanism that causes additional liquid to be added to the container such that the total liquid in the container is no longer below the predefined threshold. In one embodiment, processing logic causes additional liquid to be added to the container for a predefined amount of time after the total liquid in the container is above the predefined threshold. For example, additional liquid can be added for approximately 30 seconds after the predefined threshold has been reached. In an alternate embodiment, processing logic stops causing additional liquid to be added to the container as soon as the predefined threshold has been reached. The process then returns to block 410, to continue monitoring the level of liquid in the container. In one embodiment, once enabled, the system continues to monitor during daylight hours indefinitely.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

The invention claimed is:

1. A simple solar wireless autofill system comprising:
    a capacitance based liquid level sensor to sense a level of liquid in a container positioned at an intended level of the liquid in the container;
    a wireless transmitter comprising a switch, a timer, and an RF transceiver, attached to the container to receive on-off data from the liquid level sensor, which indicates whether a level of liquid in the container is at the level of the liquid level sensor, and to send a signal to a receiver when the level of liquid in the container is below the level of the liquid level sensor, wherein the switch energizes the timer, and pulses from the timer cause the transmitter to send the signal to the receiver, such that the signal is not sent to the receiver when the pulses are not a steady stream of pulses, indicating that the liquid in the container is moving in a wave motion; and
    the receiver to receive the signal and to control a valve to cause additional liquid to be added to the container in response to the signal.

2. The solar wireless autofill system of claim 1, wherein the liquid level sensor and the wireless transmitter are part of a self-contained transmitter module attached to a wall of the container.

3. The solar wireless autofill system of claim 2, further comprising:
    a battery saver to transmit a sleep signal to the wireless transmitter when an amount of light sensed by a solar cell is below a predefined light level, wherein the sleep signal causes the wireless transmitter to be turned off when the wireless transmitter is in a dark location, wherein the solar wireless autofill system uses a negligible amount of battery when the wireless transmitter is turned off.

4. The solar wireless autofill system of claim 1, wherein the wireless transmitter and the receiver are paired to prevent communication with other systems.

5. The solar wireless autofill system of claim 1, wherein an interruption in the signal from the wireless transmitter automatically turns off the valve to prevent overfill of the container.

6. The solar wireless autofill system of claim 1, wherein the wireless transmitter further comprises a first timer and the receiver comprises a second timer, to prevent rapid cycling of the valve.

7. The solar wireless autofill system of claim 6, wherein the receiver actuates the valve upon receiving the signal from the wireless transmitter, wherein the signal comprises a train of pulses indicating that the liquid in the container is calm and below the predefined level.

8. The solar wireless autofill system of claim 1, further comprising:
    a solar cell to charge a battery and to detect light; and
    low current switch to power the solar wireless autofill system based on the detected light.

9. A method to use a simple solar autofill system for filling a container, the method comprising:
    receiving on-off data from a capacitive liquid level sensor, which indicates whether a level of liquid in the container is at the level of the liquid level sensor;
    sending a signal to a receiver when the level of liquid in the container is below the level of the liquid level sensor,
    sensing, with the capacitive liquid level sensor, whether a level of liquid in the container is at a predefined level;
    receiving a signal from the liquid level sensor when the level of liquid is below the predefined level;
    energizing a timer when the signal is received from liquid level sensor;
        determining whether the liquid in the container is moving in a wave motion based on pulses from the timer which cause a transmitter to send a signal to a receiver, such that the signal is not sent when the pulses are not a steady stream of pulses indicating that the liquid in the container is moving in a wave motion; and
        automatically causing liquid to be added to the container by the simple solar autofill system when the level of liquid in the container is below a predefined level and the liquid in the container is not moving in the wave motion.

10. The method of claim 9, further comprising:
    when an amount of light sensed by a solar cell is below a predefined light level, transmitting a sleep signal to cause a transmitter to go to sleep.

11. The method of claim 10, wherein the amount of light sensed by the solar cell is below the predefined light level during night.

12. The method of claim 10, wherein the amount of light sensed by the solar cell is below the predefined light level when the transmitter is in the container.

13. A simple solar wireless autofill system comprising:
    a wireless transmitter module to attach to a container to receive an indicator that a level of liquid in the container is below a predefined level from a capacitive liquid level sensor, the wireless transmitter module comprising a switch, a timer, and an RF transceiver, wherein pulses from the timer cause the RF transceiver to send a signal when the level of liquid in the container is below a predefined level;
    a receiver module to receive the signal from the wireless transmitter module, the receiver module including second RF transceiver, a second timer, and a switch to turn on a valve, wherein signal is not sent to the switch so the valve does not activate when the liquid in the container is in a wave motion as determined by a lack of a steady stream of pulses from the wireless transmitter module, to trigger the valve to add liquid to the container in response to the signal.

14. The solar wireless autofill system of claim 13, wherein the wireless transmitter module comprises:
- a capacitance sensor activated when in contact with liquid;
- a battery;
- a solar element to charge the battery when light is received by the solar element and to cause the solar wireless autofill system to be turned off when there is insufficient light received by the solar element; and
- a wireless transmitter to send the signal to the receiver module.

15. The solar wireless autofill system of claim 14, wherein the wireless transmitter module further comprises:
- a timer to generate the signal for the receiver module, the signal comprising a stream of pulses; and
- a sleep switch to turn off the solar wireless autofill system when there is insufficient light received by the solar element.

16. The solar wireless autofill system of claim 14, wherein the wireless transmitter comprises a transceiver including the transmitter.

17. The solar wireless autofill system of claim 13, wherein the receiver module comprises:
- a receiver to receive a signal from the wireless transmitter module;
- a solid state switch to energize the valve; and
- the valve to turn on and off a liquid flow, in response to instructions from the receiver.

18. The solar wireless autofill system of claim 17, wherein the receiver module further comprises:
- a timer to receive a pulsed signal from the receiver and generate a steady on output signal for the solid state switch; and
- wherein the valve is a solenoid valve.

19. The solar wireless autofill system of claim 18, wherein the timer delays a start of the steady on output signal to avoid fluctuations due to the wave motion.

\* \* \* \* \*